United States Patent
Mullighan et al.

(10) Patent No.: US 12,516,384 B2
(45) Date of Patent: Jan. 6, 2026

(54) METHODS AND KIT FOR ANALYZING RESPONSIVENESS OF PATIENTS TO CD19 IMMUNOTHERAPY

(71) Applicant: St. Jude Children's Research Hospital, Inc., Memphis, TN (US)

(72) Inventors: Charles G. Mullighan, Memphis, TN (US); Kathryn G. Roberts, Memphis, TN (US); Chunxu Qu, Memphis, TN (US); Yaqi Zhao, Memphis, TN (US)

(73) Assignee: St. Jude Children's Research Hospital, Inc., Memphis, TN (US)

( * ) Notice: Subject to any disclaimer, the term of this patent is extended or adjusted under 35 U.S.C. 154(b) by 946 days.

(21) Appl. No.: 17/760,869

(22) PCT Filed: Sep. 17, 2020

(86) PCT No.: PCT/US2020/051154
§ 371 (c)(1),
(2) Date: Mar. 16, 2022

(87) PCT Pub. No.: WO2021/055528
PCT Pub. Date: Mar. 25, 2021

(65) Prior Publication Data
US 2022/0356531 A1 Nov. 10, 2022

Related U.S. Application Data

(60) Provisional application No. 62/901,951, filed on Sep. 18, 2019.

(51) Int. Cl.
| | | |
|---|---|---|
| *C12Q 1/6886* | (2018.01) | |
| *A61K 35/28* | (2015.01) | |
| *A61K 38/17* | (2006.01) | |
| *A61P 35/02* | (2006.01) | |
| *C07K 16/28* | (2006.01) | |
| *C12Q 1/6869* | (2018.01) | |

(52) U.S. Cl.
CPC .......... *C12Q 1/6886* (2013.01); *A61K 35/28* (2013.01); *A61K 38/1709* (2013.01); *A61P 35/02* (2018.01); *C07K 16/2803* (2013.01); *C07K 2317/31* (2013.01); *C12Q 1/6869* (2013.01); *C12Q 2600/106* (2013.01); *C12Q 2600/158* (2013.01)

(58) Field of Classification Search
CPC .................................................... C12Q 1/6886
USPC ........................................................ 424/136.1
See application file for complete search history.

(56) References Cited

U.S. PATENT DOCUMENTS

2017/0239294 A1 8/2017 Thomas-Tikhonenko et al.

OTHER PUBLICATIONS

Fry et al (Nat Med, 2018, 24(1): 20-28).*
Vandenbroucke et al (Nucleic Acids Research, 2001, 29(13)(e68): 1-7).*
Zhou et al (Immunogenetics, 1992, 35: 102-111).*
Fischer, J. et al. (2017) "CD19 Isoforms Enabling Resistance to CART-19 Immunotherapy Are Expressed in B-ALL Patients at Initial Diagnosis," Journal of Immunotherapy 40(5):187-195.
International Preliminary Report on Patentability in PCT/US2020/051154 dated Mar. 31, 2022.
International Search Report and Written Opinion in PCT/US2020/051154 dated Feb. 9, 2021.
Jazirehi, A.R., et al. (2017) "Clinical Implications of Anti-CD19 Chimeric Antigen Receptors (CAR) T Cell Therapy in Acute Lymphoblastic Leukemia (ALL)," Immunotherapy 3(2):1000142.
Maude, S.L., et al. (2014) "Chimeric Antigen Receptor T Cells for Sustained Remissions in Leukemia," New England Journal of Medicine 371:1507-1517.
Maude, S.L., et al. (2015) "CD19-targeted chimeric antigen receptor T-cell therapy for acute lymphoblastic leukemia," Blood 125(25):4017-4023.
Sotillo, E., et al. (2015) "Convergence of Acquired Mutations and Alternative Splicing of CD19 Enables Resistance to CART-19 Immunotherapy ," Cancer Discovery 5(12):1282-95.

* cited by examiner

*Primary Examiner* — Sean E Aeder
(74) *Attorney, Agent, or Firm* — Licata & Tyrrell P.C.; Jane Massey Licata

(57) ABSTRACT

Kits and methods for determining resistance of a B-cell malignancy to blinatumomab immunotherapy and selecting a treatment for a subject with a B-cell malignancy based upon the expression level of an exon 2 intra-exonic splice variant of CD19 are provided.

6 Claims, 2 Drawing Sheets

Specification includes a Sequence Listing.

```
                           SEQUENCE LISTING

<160> NUMBER OF SEQ ID NOS: 14

<210> SEQ ID NO 1
<211> LENGTH: 100
<212> TYPE: DNA
<213> ORGANISM: Homo sapiens

<400> SEQUENCE: 1
taacgctgtg ctgcagtgcc tcaaggggac ctcagatggc cccactcagc agctgacctg      60
gtctcgggag tccccgctta aaccttctt aaaactcagc                            100

<210> SEQ ID NO 2
<211> LENGTH: 100
<212> TYPE: DNA
<213> ORGANISM: Homo sapiens

<400> SEQUENCE: 2
ctggctggac agtcaatgtg gagggcagcg gggagctgtt ccggtggaat gtttcggacc      60
taggtggcct gggctgtggc ctgaagaaca ggtcctcaga                            100

<210> SEQ ID NO 3
<211> LENGTH: 100
<212> TYPE: DNA
<213> ORGANISM: Homo sapiens

<400> SEQUENCE: 3
agctgacctg gtctcgggag tccccgctta aaccttctt aaaactcagc ctggctggac       60
agtcaatgtg gagggcagcg gggagctgtt ccggtggaat                            100

<210> SEQ ID NO 4
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 4
ctgaccacca tgccacctcc tcgcc                                            25

<210> SEQ ID NO 5
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 5
gcggtctttg gcccacacat acagc                                            25

<210> SEQ ID NO 6
<211> LENGTH: 25
<212> TYPE: DNA
<213> ORGANISM: Artificial sequence
<220> FEATURE:
<223> OTHER INFORMATION: Synthetic oligonucleotide
```

<400> SEQUENCE: 6
ctgaccacca tgccacctcc tcgcc                                          25

<210> SEQ ID NO 7
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 7
ggtgcacatg ggtccaggag agggg                                          25

<210> SEQ ID NO 8
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 8
gccccggaga gtctgaccac catgc                                          25

<210> SEQ ID NO 9
<211> LENGTH: 26
<212> TYPE: DNA
<213> ORGANISM: Artificial sequence
<220> FEATURE:
<223> OTHER INFORMATION: Synthetic oligonucleotide

<400> SEQUENCE: 9
cccacatatc tctggccggg cgatcg                                         26

<210> SEQ ID NO 10
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 10
agtctgacca ccatgccacc tcctc                                          25

<210> SEQ ID NO 11
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 11
acacacactt acacacatgc acaca                                          25

<210> SEQ ID NO 12
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 12
aaactcagcc tggctggaca g                                              21

<210> SEQ ID NO 13
<211> LENGTH: 25

```
<212> TYPE: DNA
<213> ORGANISM: Artificial sequence
<220> FEATURE:
<223> OTHER INFORMATION: Synthetic oligonucleotide

<400> SEQUENCE: 13
accccaaggg gcctaagtca ttgct                                    25

<210> SEQ ID NO 14
<211> LENGTH: 25
<212> TYPE: DNA
<213> ORGANISM: Artificial sequence
<220> FEATURE:
<223> OTHER INFORMATION: Synthetic oligonucleotide

<400> SEQUENCE: 14
cttcccagta cccccacaca gatgc                                    25
```

METHODS AND KIT FOR ANALYZING RESPONSIVENESS OF PATIENTS TO CD19 IMMUNOTHERAPY

INTRODUCTION

This patent application is the national phase under 35 U.S.C. § 371 of PCT International Application No. PCT/US2020/051154, filed Sep. 17, 2020, which claims the benefit of priority from U.S. Provisional Ser. No. 62/901,951 filed Sep. 18, 2019, the contents of which are incorporated herein by reference in their entireties.

BACKGROUND

CD19 is an 85-95 kDa transmembrane cell surface glycoprotein receptor. CD19 is a member of the immunoglobulin (Ig) superfamily of proteins, and contains two extracellular Ig-like domains, a transmembrane, and an intracellular signaling domain. CD19 and CD81, in combination with complement receptors CD21 and CD35, form a coreceptor that when coligated with the B-cell receptor lowers the threshold of activation by several orders of magnitude. The key point of relevance for treatment of B cell malignancies is that CD19 is expressed in a tightly regulated manner on B cells, being restricted to early B cell precursors at the stage of IgH gene rearrangement, but is not expressed on hematopoietic stem cells or mature plasma cells.

Because of its specificity to B cells, CD19 has been established as a promising target for both antibody and chimeric antigen receptor (CAR)-T cell-based therapies (Kochenderfer, et al. (2010) *Blood* 116:4099-102; Lee, et al. (2015) *Lancet* 385:517-28). A number of novel approaches targeting anti-CD19 are provided in Table 1.

TABLE 1

| Antibody (Sponsor) | Class | Indications |
|---|---|---|
| Blinatumomab (Amgen) | Bispecific scFv-CD19xCD3 (BiTE) | ALL, DLBCL |
| SAR3419 (Sanofi-Aventis) | Antibody-drug conjugate | DLBCL, ALL |
| MEDI-551 (Medimmune) | Glyco-engineered antibody | DLBCL, CLL, MS |
| Combotox (Montefiore Medical Center) | scFv Immunotoxins (CD19, CD22) | ALL |
| DT2219ARL (NCI) | Bispecific immunotoxin - CD19/CD20 | B cell malignancies |
| MOR-208/Xmab5574 (Morphosys/Xencor) | Fc engineered antibody | CLL |
| XmAb-5871 (Xencor/Amgen) | Fc engineered antibody | RA, SLE |
| MDX-1342 (Bristol-Myers Squibb) | Glyco-engineered antibody | CLL, RA |
| CD19-CAR (NCI) | CAR | NHL, CLL |
| CART19 (University of Pennsylvania) | CAR | CLL |
| SGN-19A (Seattle Genetics) | Antibody-drug conjugate | ALL, NHL |
| AFM11 (Affimed) | Trivalent bispecific antibody - CD19xCD3 | ALL, NHL |
| GBR401 (Glenmark) | Naked antibody | B cell malignancies |
| MGD011 (Macrogenics) | Bispecific scFv - CD19xCD3 (DART) | B cell malignancies |

Hammer (2012) *mAbs* 4 (5): 571-577.
ALL, acute lymphoblastic leukemia; BiTE, bispecific T cell engager; CAR, Chimeric antigen receptor; CLL, chronic lymphocytic leukemia; DART, dual-affinity re-targeting; DLBCL, diffuse large B cell lymphoma; MS, multiple sclerosis; NHL, non-Hodgkin lymphoma; RA, rheumatoid arthritis; SLE, system lupus erythematosus.

Despite the success of these therapies, relapse does occur. Notably, 10-20% of pediatric and adult B-ALL treated with CD19 CAR therapy relapse (Maude, et al. (2015) *Blood* 125:4017-4023) and about 30-50% of these relapses are characterized by the loss of detectable CD19 (Maude, et al. (2014) *N. Engl. J. Med.* 371:1507-1517). In patients treated with CD19 CAR therapy, hemizygous deletions spanning the CD19 locus and de novo frameshift and missense mutations in exon 2 of CD19 have been observed in some relapse samples (Sotillo, et al. (2015) *Cancer Discov.* 5(12): 1282-95). In addition, alternatively spliced CD19 mRNA species, including one lacking a portion of exon 2, which encodes the CART19 epitope, have been found and hypothesized to contribute to CART19 escape and relapse (Fischer, et al. (2017) *J. Immunother.* 40(5):187-195).

SUMMARY OF THE INVENTION

This invention provides a method for selecting a treatment for a subject with a B-cell malignancy, by (a) measuring CD19 exon2del transcript expression levels in a sample of malignant B-cells from a subject; (b) comparing the levels of CD19 exon2del transcript expression obtained in step (a) with a reference level of CD19 exon2del transcript or wild-type CD19 transcript expression; and (c) selecting a CD19-independent treatment when the levels of CD19 exon2del transcript expression are elevated in the sample compared to the reference level. In some embodiments, the subject has acute lymphoblastic leukemia. In another embodiment, the CD19-independent treatment comprises bone marrow transplantation or administration of an anti-CD22 immunotherapeutic, a BH3 mimetic or chemotherapeutic.

A kit composed of a pair of primer oligonucleotides for amplifying a nucleic acid of SEQ ID NO:3, and optionally including a probe that hybridizes to the exon 2 splice junction of SEQ ID NO:3, is also provided. In some embodiments, the pair of primer oligonucleotides includes: (a) SEQ ID NO:4 and SEQ ID NO:5; (b) SEQ ID NO:6 and SEQ ID NO:7; (c) SEQ ID NO:8 and SEQ ID NO:9; (d) SEQ ID NO:10 and SEQ ID NO:11; or a combination thereof; and the probe comprises SEQ ID NO:12.

This invention also provides a method of determining resistance of a B-cell malignancy to blinatumomab immunotherapy by measuring CD19 exon2del transcript expression levels in a sample of malignant B-cells from a subject using the kit of this invention, wherein elevated expression levels of the CD19 exon2del transcript in the sample are indicative of resistance of the B-cell malignancy to blinatumomab immunotherapy. In some embodiments, the subject has acute lymphoblastic leukemia.

DETAILED DESCRIPTION OF THE INVENTION

Figure 1:
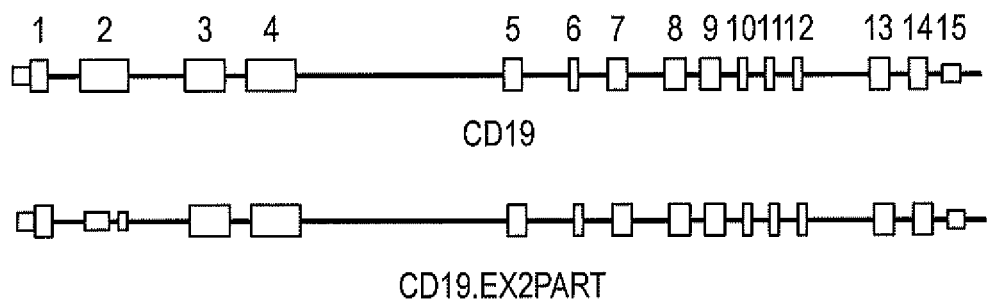
FIG. 1 is a schematic representation of canonical CD19 mRNA and the CD19 exon2del ("ex2part") splicing variant.

The present invention relates to methods and kits that use a particular variant transcript of CD19 to predict responsiveness, or lack thereof, of human tumor cells to treatment with a CD19 immunotherapeutic. The invention is based on the identification of a specific isoform of CD19, i.e., the exon 2 intra-exonic splice variant of CD19 (also referred to herein as "CD19 exon2del") the expression of which, when elevated in patients prior to and/or after treatment with a CD19 immunotherapeutic such as blinatumomab, is useful in selecting an appropriate treatment for a subject with a B-cell malignancy, as well as in predicting the likelihood of a therapeutic response to blinatumomab, including tumor regression, residual disease persistence and subsequent tumor recurrence in cancer patients receiving the CD19 immunotherapeutic.

Accordingly, one aspect of this invention provides methods for the selection of an appropriate treatment for a subject with a B-cell malignancy. The identified correlation between elevated CD19 exon2del expression and responsiveness to a CD19 immunotherapy forms the basis for a decision to apply a specific treatment regimen for the subject. Thus, in this aspect, the present invention provides a method for selecting a treatment for a subject with a B-cell malignancy in a subject in need thereof by (a) measuring the levels of CD19 exon2del transcript expression present in a sample of malignant B cells obtained from a subject; (b) comparing the levels of CD19 exon2del transcript expression obtained in step (a) with a reference level of CD19 exon2del transcript expression; and (c) selecting a CD19-independent treatment when the levels of CD19 exon2del transcript expression are elevated in the sample compared to the reference amount. In some embodiments, the subject has a CD19-negative cancer. In other embodiments, the subject has a CD19-positive cancer. In the certain embodiments, the subject has acute lymphoblastic leukemia. While no or low expression of the CD19 exon2del transcript compared to a reference level predicts sensitivity to CD19 immunotherapy, elevated expression of the CD19 exon2del transcript compared to a reference level is predictive of resistance or potential to develop resistance to a CD19 immunotherapy such that it is unlikely that the subject will benefit from treatment with the CD19 immunotherapy. When available, alternative treatment, in particular a CD19-independent therapy, can be administered accordingly. Conversely, no or low CD19 exon2del expressing tumor cells are likely to be responsive to CD19 immunotherapy and subjects with such tumor cells can benefit from a treatment that targets CD19. Tailoring treatment to the subject based on expression of CD19 exon2del transcript will result in both cost savings and toxicity sparing by eliminating administration of ineffective treatments, and in improved clinical outcome by implementing specific treatment based on marker expression.

Another object of the present invention is to provide methods of early prediction of tumor response in a subject receiving or suitable for receiving a CD19 immunotherapy, specifically blinatumomab. In particular, the invention is directed to a method for determining resistance of a B-cell malignancy to blinatumomab immunotherapy by measuring expression levels of the CD19 exon2del transcript in a sample of malignant B cells from a subject, wherein elevated expression levels of the CD19 exon2del transcript in the sample is indicative of resistance of the B-cell malignancy to blinatumomab immunotherapy. In certain embodiments, the subject has acute lymphoblastic leukemia. The identified differential expression of the CD19 exon2del transcript provides for early prediction of tumor responsiveness, as well as tumor recurrence, in cancer subjects. While the methods of the invention rely on measuring the expression levels of the CD19 exon2del transcript, alternative embodiments include measuring the expression level of the protein encoded by the CD19 exon2del transcript, using for example ELISA. The measurements obtained may be normalized and/or compared against the expression level of one or more reference RNA transcripts or their expression products.

The CD19 protein expressed on the surface of B cells is encoded by a gene located on chromosome 16 at 16p11.2. The CD19 gene covers 7.59 Kb from positions 28943083 to 28950676 of chromosome 16. While various splice variants have been identified, this invention is directed to a CD19 splice variant with a partial deletion of exon 2. This variant or isoform has a deletion of 131 bp, which has been suggested to lead to a frameshift within exon 2 (Fischer, et al. (2017) *J. Immunother.* 40(5):187-195). Compared with the RefSeq sequence of exon 2 (GENBANK Accession No. NM_001770.5), the frameshift leads to a premature integration of a stop codon which results in a truncated protein ending in exon 2, or a downstream start site in exon 4.

Blinatumomab is a recombinant, single-chain, anti-CD19/anti-CD3 bispecific monoclonal antibody with potential immunostimulating and antineoplastic activities. Blinatumomab possesses two antigen-recognition sites, one for the CD3 complex, a group of T cell surface glycoproteins that complex with the T cell receptor (TCR), and one for CD19. This bispecific monoclonal antibody brings CD19-expressing tumor B-cells, cytotoxic lymphocytes (CTLs) and helper T lymphocytes (HTLs) together, which results in CTL- and HTL-mediated cell death of CD19-expressing B-lymphocytes. Blinatumomab has been approved for the treatment of acute lymphoblastic leukemia (ALL) and has activity against a number of B-cell malignancies presenting CD19 antigen including multiple myeloma, diffuse large B-cell lymphoma, non-Hodgkin lymphoma, and chronic lymphocytic leukemia. It has also been suggested for use in certain autoimmune diseases such as rheumatoid arthritis.

As indicated, the expression level of the CD19 exon2del transcript is of use in predicting the likelihood of a therapeutic response to blinatumomab as well as in the selection of an appropriate treatment of a subject with a B-cell malignancy. In conjunction with the methods of this invention, a biological sample from a subject is collected to measure the expression levels of the CD19 exon2del transcript. The term "biological sample" refers to any fluids or tissues containing the subject's B cells. Preferably, the biological sample is the subject's blood or bone marrow. More preferably, the biological sample includes malignant B cells. Most preferably, the biological sample includes malignant B cells from a subject with acute lymphoblastic leukemia. In some embodiments, the subject is an adult. In other embodiments, the subject is a pediatric patient.

The methods of the invention can be implemented with an unprocessed biological sample (i.e., as sampled without undergoing any modification), or a biological sample subjected to one or more additional processing steps deemed to be required by those skilled in the art. These treatments include erythrocyte lysis, mononuclear cell isolation (e.g., isolation on a hydrophilic polysaccharide sold under the tradename FICOLL®) and/or the addition of molecules for preserving the biological sample (e.g., protease inhibitors). Techniques such as erythrocyte lysis and mononuclear cell isolation particularly make it possible to increase the proportion of B cells in relation to the other cells present in the biological sample. In this way, the methods of the invention can further include a step for increasing the proportion of B cells in relation to the other cells present in the biological sample. According to certain embodiments, the measured expression level of the CD19 exon2del transcript is the measurement of the expression level of the CD19 exon2del transcript in B cells, in particular malignant B cells.

In the present methods, the term "expression level" or "level of expression" refers to the quantity of CD19 exon2del transcript expressed by the cells. The expression level can be measured quantitatively or semi-quantitatively. It is contemplated that the exact quantity of CD19 exon2del transcript expressed by the cells can be determined, or the quantity can be based upon whether the expression level of the CD19 exon2del transcript is significantly greater than a reference level of CD19 exon2del or wild-type CD19 transcript. This can be readily determined by those skilled in the art using a pool of reference subjects that have positively responded to treatment with a CD19 immunotherapeutic such as blinatumomab and measuring the expression level of the CD19 exon2del transcript and/or wild-type CD19 transcript in the cells of these subjects. Alternatively, the expression level of the CD19 exon2del transcript may be determined with reference to the expression level of the CD19 exon2del transcript and/or wild-type CD19 transcript in the same subject prior to treatment. In one aspect, CD19 exon2del transcript expression may be evaluated in a sample from a subject treated with a CD19 immunotherapeutic (e.g., blinatumomab) preferably between 24 hours and 21 days following the start of treatment. If the method according to the invention reveals a CD19 exon2del transcript expression level in a subject's cells greater than the reference expression, said subject would likely not respond positively to treatment with a CD19 immunotherapeutic such as blinatumomab, i.e., there would be no response, there would be persistence of residual disease, and/or there would be subsequent tumor recurrence were the subject to receive treatment with a CD19 immunotherapeutic such as blinatumomab.

The expression level of the CD19 exon2del transcript can be detected by any methods known in the art, including, but not limited to, sequencing, next-generation sequencing (e.g., transcriptome sequencing, including long read sequencing), polymerase chain reaction (PCR), and real-time quantitative PCR, real-time quantitative RT-PCR northern blot, microarray, in situ hybridization, serial analysis of gene expression (SAGE), cap analysis gene expression (CAGE), massively parallel signature sequencing (MPSS), direct multiplexed measurements of the type employed in the Nanostring platform, and any combinations thereof. Northern blots, microarrays, INVADER® assays, and RT-PCR combined with capillary electrophoresis have all been used to measure expression levels of mRNA in a sample. See *Gene Expression Profiling: Methods and Protocols,* Richard A. Shimkets (ed) Humana Press, 2004.

In certain embodiments, transcript expression levels are measured by reverse transcription quantitative polymerase chain reaction (RT-PCR). In one configuration, RT-PCR analysis is carried out using the TAQMAN® method for quantifying a PCR-amplified cDNA of mRNA. A TAQMAN® gene expression assay uses a pair of oligonucleotide primers for PCR, as well as a probe oligonucleotide. The primer oligonucleotides hybridize to different sites within a nucleic acid encoding CD19 exon2del, in opposite orientations. The probe oligonucleotide includes a sequence that hybridizes to a site between the primer hybridization sites. In some embodiments, at least one of the probe and primer oligonucleotides has a sequence that spans an exon-exon boundary in order to minimize spurious signal generated by contaminating genomic DNA acting as template. In certain embodiments, the assay is isoform-selective such that the probe has a sequence that spans the exon 2 splice junction of the CD19 exon2del transcript. In other embodiments, the probe oligonucleotide further includes a reporter moiety, e.g., a fluorophore, and an optional fluorescence quencher, e.g., a non-fluorescent quencher (NFQ). Any fluorophore which can be subjected to quenching by a quencher may be used as the reporter moiety. In a non-limiting example, the fluorophore VIC™, as provided in kits by Applied Biosystems, can be used as a reporter fluorophore moiety in an RT-PCR gene expression assay. As a result of thermal cycling, fluorophore is released if probes and primers are hybridized to a cDNA target. Measurement of released fluorophore provides a quantifiable signal, wherein fluorescence intensity can be monotonically related to RNA concentration in the target sample. Fluorophore released from a quenched primer can be quantified by any method known in the art. In some embodiments, a fluorimeter is used. Exemplary primer and probe oligonucleotides of use in a TAQMAN® gene expression assay are provided in Table 3 and as SEQ ID NO:4-12.

In some embodiments, the probe can further include a minor groove binder (MGB). In some embodiments, the MGB moiety can be covalently attached to the 3' end of the probe. The structure of the MGB can be, in a non-limiting example, a trimer of 1,2-dihydro-(3H)-pyrrolo[3,2-e]indole-7-carboxylate. Because the presence of an MGB increases the stability of hybrid nucleic acids, oligonucleotide-MGB conjugates as short as 8-mers, or G-C-rich 6-mers, are able to form stable hybrids with complementary sequences, and therefore allow the use of probes as short as six nucleotides. MGBs furthermore increase the specificity of probe-target hybridization.

In accordance with the TAQMAN® gene expression assay, RNA quantity can be analyzed in either a one-step or two-step process. In one-step process configurations, a thermostable polymerase that exhibits reverse transcription, DNA synthesis utilizing a DNA template, and 5'-to-3' exonuclease activity, e.g., recombinant *Thermus thermophilus* DNA polymerase (rTth polymerase), is used. Because rTth polymerase exhibits all enzyme activities involving nucleic acids needed for an RT-PCR expression analysis, an assay and kit can be provided to a user, which includes all of the components for an RT-PCR analysis except for the target sample.

In two-step process configurations, reverse transcription and PCR amplification are conducted separately. Reverse transcription can be catalyzed using a reverse transcriptase such as a reverse transcriptase from Avian Myeloblastosis Virus or Moloney Murine Leukemia Virus. Second-strand synthesis, and amplification of cDNA can be subsequently carried out in a second step using a DNA polymerase, for example, a heat-stable polymerase such as Taq polymerase. The Taq polymerase can be, in some embodiments, a Taq polymerase that can be supplied complexed with a heat-denaturable blocking agent, for example, an antibody directed against the Taq polymerase, in order to prevent elongation of an oligonucleotide prior to an initial heat denaturation step at the start of a thermal cycling protocol.

As an alternative to a TAQMAN® gene expression assay, a conventional RT-PCR assay is carried out using fluorescently-tagged primers that amplify both mRNA encoding wild-type CD19 and CD19 exon2del. In such an assay, the relative abundance of each transcript can be quantitated using capillary sequencing. Exemplary primers of use in a conventional RT-PCR assay are provided in Table 3 and as SEQ ID NO:4-9.

In accordance with the present methods, a subject identified as having an elevated expression level of the CD19 exon2del transcript as compared to a reference level will likely not respond to treatment with a therapeutic targeting CD19, in particular an immunotherapeutic targeting exon 2 of CD19. Thus, the present invention provides methods for the selection of an appropriate cancer treatment regimen. As used herein, the phrase "treatment regimen" refers to a treatment plan that specifies the type of treatment, dosage, schedule and/or duration of a treatment provided to a subject in need thereof (e.g., a subject diagnosed with cancer). The selected treatment regimen can be an aggressive one which is expected to result in the best clinical outcome (e.g., complete cure of the disease) or a more moderate one which may relieve symptoms of the disease yet results in incomplete cure of the disease. The type of treatment can include a surgical intervention, administration of a therapeutic drug, exposure to radiation therapy and/or any combination thereof. The dosage, schedule and duration of treatment can vary, depending on the severity of disease and the selected type of treatment, and those of skill in the art are capable of adjusting the type of treatment with the dosage, schedule and duration of treatment.

Ideally, treatment of a subject identified as having an elevated expression level of the CD19 exon2del transcript as compared to a reference level of CD19 exon2del transcript and/or wild-type CD19 transcript is best achieved by selecting a CD19-independent treatment. A "CD19-independent treatment" refers to a therapeutic that does not have a mode of action that is dependent upon the presence of wild-type CD19, in particular an immunotherapeutic that specifically binds to exon 2 of wild-type CD19. Such CD19-independent treatments include, but are not limited to, bone marrow transplantation or administration of an anti-CD22 immunotherapeutic (e.g., inotuzumab), a BH3 mimetic (e.g., venetoclax or navitoclax) or conventional chemotherapeutics such as vincristine, dexamethasone, prednisone, an anthracycline (e.g., doxorubicin or daunorubicin), cyclophosphamide, L-asparaginase (or pegaspargase), imatinib, dasatinib, and/or high doses of methotrexate or cytarabine.

The invention also provides kits for measuring the level of CD19 exon2del transcript expression in a sample. The kits may include one or more nucleic acid probes and/or primers that hybridize to nucleic acids encoding wild-type CD19 and/or CD19 exon2del. In certain aspects, a kit of the invention includes a pair of primer oligonucleotides for amplifying a nucleic acid that spans the splice junction of CD19 exon2del as set forth in SEQ ID NO:3. In some embodiments, the kit further includes a probe that hybridizes to the exon 2 splice junction of SEQ ID NO:3. The kits of the invention may also include detection reagents, e.g., reagents that are detectably labeled. The kits may include assay reagents, buffers, and written instructions for use of the kit in predicting the likelihood of a therapeutic response in a cancer patient being treated with blinatumomab, and may include other reagents and information such as control or reference standards, wash solutions, analysis software, etc.

In one configuration, a kit of the invention may include primer oligonucleotides that hybridize to nucleic acids encoding CD19 exon2del and a probe oligonucleotide that hybridizes to a site between the primer hybridization sites. In certain embodiments, the probe has a sequence that spans the exon 2 splice junction of CD19 exon2del. Ideally, the probe oligonucleotide further includes a reporter moiety. Exemplary primer and probe oligonucleotides of use in the kit of this invention are provided in Table 3 and as SEQ ID NO:4-12.

In an alternative configuration, a kit of the invention includes primer oligonucleotides that hybridize to nucleic acids encoding wild-type CD19 and CD19 exon2del. Exemplary primer oligonucleotides of use in this kit of the invention are provided in Table 3 and as SEQ ID NO:4-9.

The present invention is based on the discovery that when the expression of an alternative spliced transcript encoding CD19 (exon2del), which lacks a portion of exon 2 encoding the epitope for blinatumomab, is elevated prior to and/or after treatment with blinatumomab, responsiveness to treatment with blinatumomab is diminished. While the results presented herein were obtained for subjects with B-progenitor acute lymphoblastic leukemia treated with blinatumomab, elevated expression of CD19 exon2del transcript can also be applied to evaluating response to treatment with any CD19 immunotherapy targeting exon 2 (see, e.g., Table 1), as well as any disease for which CD19 is the therapeutic target including, but not limited to, Follicular Lymphomas (FL), Chronic lymphocytic leukemia (CLL), mantle cell lymphoma (ML), B-cell lymphomas, Myeloma, Waldenström's Disease (WD), multiple sclerosis (MS), rheumatoid arthritis (RA); and system lupus erythematosus (SLE).

The following non-limiting examples are provided to further illustrate the present invention.

Example 1: Materials and Methods

Patients and Clinical Specimens. Forty-four patients with r/r precursor B-cell ALL treated with blinatumomab (Aldoss, et al. (2017) *Am. J. Hematol.* 92:858-865) were retrospectively analyzed to identify mechanisms of response and resistance to blinatumomab. Bone marrow (BMMC) or peripheral blood (PBMC) samples were selected based on availability of cryopreserved leukemic blasts. Tumor cells were enriched by FACS when a sample contained less than 59% blasts.

Transcriptome Sequencing. Total-stranded RNA-seq (100 bp paired-end reads) was performed using the TRUSEQ® library preparation on the HISEQ® 4000 platform (Illumina). A low input RNA library preparation kit (NuGen OVATION® V2) was used for samples with limiting material (2-100 ng), Sequencing reads were mapped to the GRCh37 human genome reference by STAR (version 2.4.2a) through the suggested two-pass mapping pipeline. Gene annotation downloaded from Ensemble website was used for STAR mapping and the following read-count evaluation. All samples were sequenced with RefSeq coding region with 30-fold coverage of ≥15% (median±standard deviation, 37.2±7.5%). CICERO and FusionCatcher were used to detect fusions, and all the reported rearrangements were manually reviewed to keep the reliable ones. Due to the complexity of DUX4 rearrangements, some of the DUX4 fusions were manually rescued by checking the aligned reads within IGV browser.

To evaluate gene expression levels, read-count for each annotated gene was calculated by HTSeq package, and gene expression level normalization and differential expression analysis was carried out by DESeq2 Bioconductor R package. To evaluate digital gene expression level, regularized log transformed (r log) value was calculated by DESeq2. ComBat function in sva R package was used to correct the batch effect introduced by different library preparation strategies and sequencing lengths. Gene signature analysis was also carried out by DESeq2 to evaluate the differentially expressed genes through Wald's test and Benjamini-Hochberg adjustment.

Gene Set Enrichment and Pathway Analysis. Raw read-count from RNA-seq data was imported to DESeq2 for differential gene expression analysis. To perform Gene Set Enrichment Analysis (GSEA), the gene expression profile of PAX5 P80R was defined by comparing gene expression levels between PAX5 P8OR ALL and normal B cells purified from human bone marrow, and ranking genes according to fold-change and significance. GSEA was performed using mSigDB C2 genes and curated gene sets from in house analyses. Significantly regulated genes (adjusted P<0.01, $\log_2$ fold change ≥1 or ≤−1) were selected to perform Kyoto Encyclopedia of Genes and Genomes (KEGG) pathway and Gene Ontology (GO) analyses on DAVID platform.

Whole Exome/Genome Sequencing. For whole exome sequencing (WES), genomic DNA was extracted and subject to TRUSEQ® library preparation. Sequencing (100 bp paired-end reads) was performed on the HISEQ® 4000 platform (Illumina) to 100× average coverage. Whole genome sequencing (WGS) was performed on the NOVASEQ® 6000 system (Illumina) to a target depth of 800 million paired-end 150 bp reads per sample for 30× average coverage.

Paired-end WGS and WES reads were mapped to human reference genome GRCh37 by BWA (version 0.7.12). Samtools (version 1.3.1) were used to generate chromosomal coordinate-sorted and indexed bam files, and then processed by Picard (version 1.129) MarkDuplicates module to mark PCR duplications. Then the reads were realigned around potential indel regions by GATK (version 3.7) IndelRealigner module. Sequencing depth and coverage was assessed based on coding regions (~34 Mb) defined by Ref Seq genes. UnifiedGenotyper (within GATK v3.7) and muTect2 (Beta version within GATK v4) modules were applied to call single nucleotide variants (SNVs) and indels from leukemia and paired germline samples. The raw mutations were filtered by a homemade pipeline to exclude: (1) reported common SNVs/indels from dbSNP v150; and (2) germline mutations detected from matched germline control samples. All the non-silent SNVs/indels passed the filtering pipeline were manually reviewed and only the highly reliable somatic ones were reported. Meanwhile, adjacent nucleotide changes observed on the same allele were merged into one mutation.

CD19 Exon Junction Analysis. Splicing junctions from STAR mapping were generated by merging junctions based on chromosome location and intron motif type, and annotated using Ensemble (v75), followed by GENCODE v31 (lifted to GRCh37) and AceView gene structures. Splicing junctions with CPM (count per million) values greater than 0.5 in more than 5 samples were kept for further analysis. The raw read counts were normalized using Limma/Voom. Normalized CD19 exon junctions were then extracted at locus chr16:28943259-28950668. A total of 18 junctions were identified, including 15 exon junctions from 2 CD19 isoforms (NM_001770, NM_001178098), two junctions with either exon2 or exon12 skipping, and one junction with partial exon 2 deletion. Some reads mapped to the non-canonical junctions were soft clipped. After BLAT these sequences, the soft clipped reads mapped to exon junction $EJ_{23}$. Therefore, reads mapped to CD19 locus were extracted and BLAT against chr16, and exon junctions were generated by parsing the psi file.

Targeted NGS Sequencing of CD19 Locus. Primers (F' primer, ACCCCAAGGGGCCTAAGTCATTGCT, SEQ ID NO:13; and R' primer, CTTCCCAGTACCCCCACACAGATGC, SEQ ID NO:14) were designed to amplify one region (231 bp) on exon 4 of CD19, where four mutations were identified for CD19-negative relapsed cases. The targeted sequence was amplified using PHUSION® High-Fidelity DNA Polymerase (New England Biolabs). The size of amplicon was confirmed by visualization on a 1.5% agarose gel. PCR products were purified using WIZARD® SV Gel and PCR Clean-Up System (Promega) and sequencing libraries were generated by NEXTERA® XT transposase-based library preparation using KAPA HyperPrep Kits (Illumina). The libraries were sequenced using MISEQ® Reagent 500-cycles Nano Kit v2 (Illumina) on a MISEQ® sequencer.

Flow Cytometry and Immunofluorescence. Transduced NIH-3T3 cells were dissociated using TrypLE Express Enzyme (Gibco, Thermo Fisher Scientific), and stained with CD19-FITC (clone HIB19, BD Biosciences). Transduced cells were gated on RFP+ and the expression level of CD19 was assessed. For immunofluorescence staining, NIH-3T3 cells expressing wild-type or mutant CD19 were seeded overnight to poly-D-lysine-coated MILLICELL® EZ slides (Millipore), fixed for 10 minutes at room temperature with 4% paraformaldehyde and washed three times. Sites of nonspecific antibody binding were blocked by incubating cells for 60 minutes in goat serum (Sigma-Aldrich) 1× phosphate buffered saline. Cells were stained at room temperature for 1 hour with anti-CD19 (clone HIB19, Santa Cruz Biotechnology), washed and then incubated for 45 minutes with a goat anti-mouse IgG (H+L) Superclonal secondary antibody labeled with a green-fluorescent dye sold under the trademark ALEXA FLUOR® 488 (Thermo Fisher Scientific). Slides were washed and were mounted with a glycerol-based liquid mountant sold under the trademark PROLONG® Diamond Antifade Mountant, stained with DAPI (Life Technologies), and fluorescent images were captured using confocal microscope (Nikon C2).

Example 2: Patient Characteristics

Forty-four evaluable patients with r/r B-ALL who were treated with blinatumomab were identified. The cohort was divided into responders (those who achieved complete remission by morphology, n=25) and non-responders (n=19). Samples obtained before blinatumomab treatment (pre-treatment) were available for 38 patients. Of the non-responders, 11 patients achieved remission but subsequently relapsed and 5 were refractory to blinatumomab treatment (post-treatment). The median age was 35 years (range 18-75), with 29 patients (65.9%) of Hispanic ancestry. The demographic and clinical features of all patients are summarized in Table 2.

TABLE 2

| Characteristic | All cases (n = 44) |
| --- | --- |
| Age, median (range) | 34.5 (18-75) years |
| Sex, n (%) | |
| Male | 20 (66) |
| Female | 15 (34) |
| Race, n (%) | |
| Hispanic | 29 (66) |
| White | |
| African American | |
| Other/Unknown | |
| Sample collection | |
| Pre-treatment | 38 |
| Post-treatment | 16 |
| BM blast percentage, n (%) | |
| Median (range) | |
| <50% | 10 (23) |
| ≥50% | 29 (66) |
| Unknown | 5 (11) |

Example 3: Response to Blinatumomab

Overall, 25 patients (57%) achieved complete remission with blinatumomab treatment whilst 19 patients did not respond. High disease burden (defined as BM blasts ~50%) was associated with reduced response rate. It was subsequently determined whether genomic subtype may be associated with response to blinatumomab. Focusing on the pretreatment samples, total-stranded or low-input RNA-seq, and whole genome or whole exome sequencing (collectively termed DNA-seq) were performed. Genetic subtypes were determined by integrating gene fusion, copy number and gene expression data. A high prevalence of Ph-like ALL in this cohort was observed (23 of 44 patients, 52.3%), 21 (91%) of which were of Hispanic ancestry. Sixteen of 23 (70%) Ph-like ALL patients were CRLF2 rearranged (CRLF2-R), among these P2RY8-CRLF2 (n=4) and IGH-CRLF2 (n=12) were identified. Within the remaining 7 Ph-like ALL cases, four patients harbored IGH-EPOR, two NUP214-ABL1 and one TERF-JAK2. Six patients were low hypodiploid (chromosome number 31-39, 14%). The prevalence of other known subtypes was relatively low: B-other 11.4%, KMT2A-like 4.5%, Ph 4.5%, PAX5alt 4.5%, hyperdiploid (≥50 chr) 2.3%, low hyperdiploid (47-49 chr), DUX4-R 2.3% and TCF3-PBX1 2.3%. Interestingly, a high response rate of 75% (12/16) was observed for Ph-like_CRLF2 patients, 57% (4/7) for Ph-like_non-CRLF2, 67% (4/6) for low hypodiploid, and 33% (5/15) for other subtypes.

Figure 2:
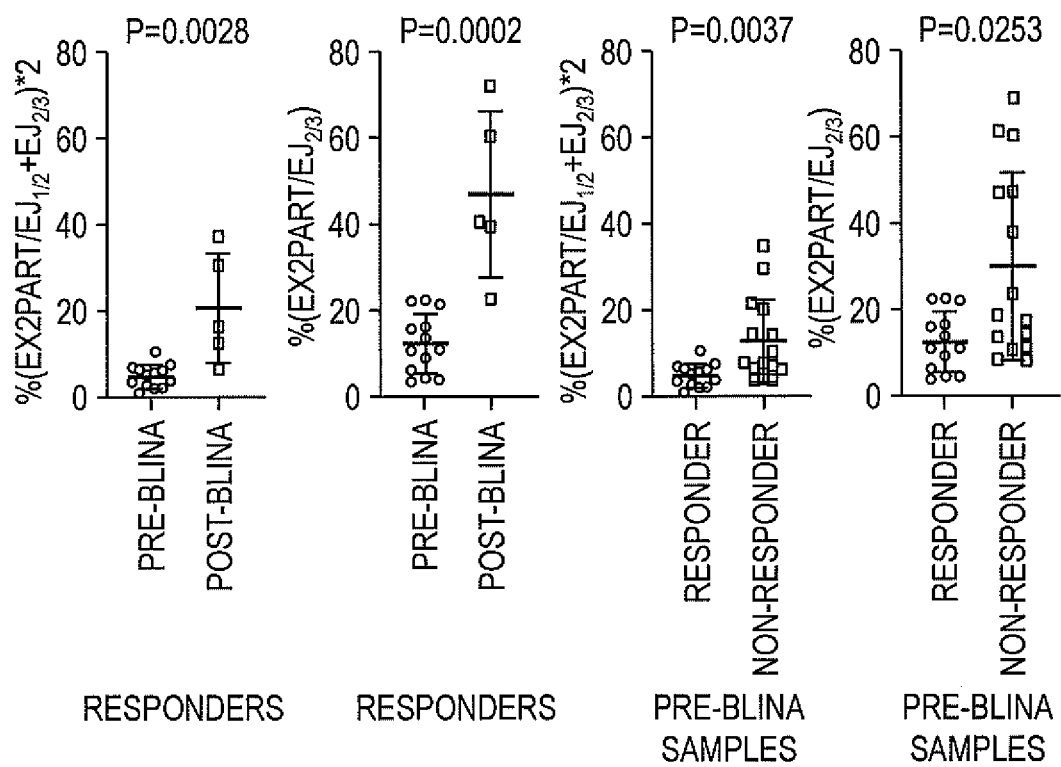
FIG. 2 shows the relative usage of CD19 exon2del. CD19 exon2del was estimated as the percentage of this junction compared to either the average of exon junctions $EJ_{1/2}$ and $EJ_{2/3}$ [% (CD19 exon2del/$EJ_{1/2}$+$EJ_{2/3}$)*2, as a conservative estimate] or only $EJ_{2/3}$ [% (CD19 exon2del/$EJ_{2/3}$], as a more closely related estimation.
Figure 3:
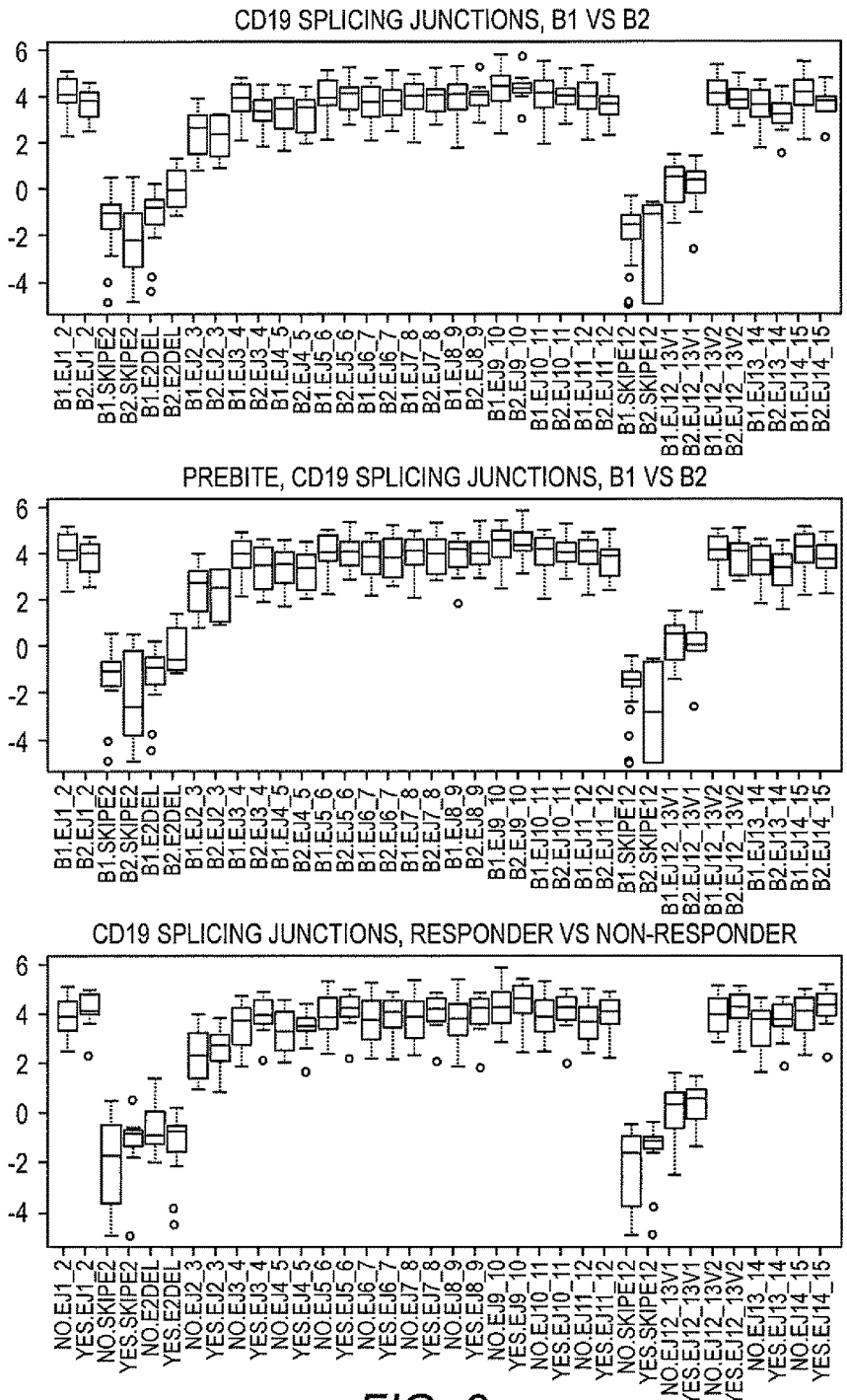
FIG. 3 shows box plots of normalized log CPM for each function between pre-treatment (B1) and relapse samples (B2), or between responders (YES) and non-responders (NO).

Example 4: Increased Usage of an Alternative CD19 Splicing Junction Associated with Blinatumomab Response and Relapse The dominant isoform of CD19 mRNA was transcript variant 2 (NM_001770). However, usage of an AceView annotated non-canonical partial exon2 deletion junction (termed "ex2part" or "exon2del") was also found to have a strong number of supporting reads (FIG. 1). The usage of ex2part junction resulted in an in-frame deletion of L66-Q108, which is part of the conformational epitope recognized by blinatumomab CD19 antibody. No significant difference in normalized read counts (log CPM) was observed between responders and non-responders at ex2part junction. The relative usage of ex2part was subsequently evaluated, which was estimated as the percentage of ex2part junction compared to either the average of exon junctions $EJ_{1/2}$ and $EJ_{2/3}$ [%(ex2part/$EJ_{1/2}$+$EJ_{2/3}$)*2, as a very conservative estimation] or only $EJ_{2/3}$[% (ex2part/$EJ_{2/3}$), as a more closely related estimation]. Usage of ex2part was observed in both CD19-positive and CD19-negative tumors. Using either estimation, pre-treatment vs relapse samples in responders, and pre-treatment samples from responders vs non-responders were compared. Three samples with low CD19 expression were excluded from the analysis as the exon junction usage could not be accurately estimated due to low number of reads. As shown in FIG. 2, the usage of ex2part was significantly higher in relapse samples compared to pre-treatment samples in patients that initially responded to blinatumomab (Blina) treatment (P=0.0002). Ex2part usage was similarly increased in non-responders compared to responders in pre-treatment samples (FIG. 2, P=0.0253). These data indicate that cases with predetermined usage of ex2part above 30% (ex2part/$EJ_{2/3}$) are likely to fail blinatumomab therapy. In contrast to previous studies, there were no significant differences in the levels of exon 2 skipping by both read counts and transcript usage between pre-treatment and relapse samples, or between responders and non-responders (FIG. 3).

Example 5: Expression Level of CD19 exon2del is Indicative of Response to Blinatumomab Treatment A biomarker for responsiveness of patients with B-progenitor acute lymphoblastic leukemia to the bispecific antibody, blinatumomab has now been identified. In particular, an association between elevated levels of a CD19 exon 2 intra-exonic splice variant (CD19 exon2del) and poor response was identified. Notably, elevated levels of the CD19 exon2del transcript were observed prior to treatment in patients that responded poorly to blinatumomab, and rising levels of the CD19 exon2del transcript were found following treatment in poor responders. Exon 2 encodes at least a portion of the epitope to which blinatumomab is directed. This means that the cells expressing the CD19 exon2del transcript likely escape and resist standard blinatumomab treatment.

To develop an assay to detect the CD19 exon2del transcript, the sequence of this isoform was confirmed. The 100 nucleotides upstream of the exon 2 deletion position were located at chr16:28943674-28943773 and found to have the sequence:

(SEQ ID NO: 1)
TAACGCTGTGCTGCAGTGCCTCAAGGGGACCTCAGATGGCCCCACTCAGC

AGCTGACCTGGTCTCGGGAGTCCCCGCTTAAACCCTTCTTAAAACTCAG

C.

The 100 nucleotides downstream of the exon 2 deletion position were located at chr16:28943904-28943933 (end of exon 2, 30 bp) and chr16:28943904-28943933 (start of exon 3, 70 bp) and found to have the sequence:

(SEQ ID NO: 2)
CTGGCTGGACAGTCAATGTGGAGGGCAGCGGGGAGCTGTTCCGGTGGAAT

GTTTCGGACCTAGGTGGCCTGGGCTGTGGCCTGAAGAACAGGTCCTCAG

A.

Accordingly, the 100 nucleotides spanning the exon 2 deletion (i.e., 50 bp upstream and 50 bp downstream) have the nucleotide sequence of:

(SEQ ID NO: 3)
AGCTGACCTGGTCTCGGGAGTCCCCGCTTAAACCCTTCTTAAAACTCAGC

|CTGGCTGGACAGTCAATGTGGAGGGCAGCGGGGAGCTGTTCCGGTGGAA

T

Based upon the sequence analysis, isoform-selective quantitative RT-PCR assays were developed to detect the expression level of the CD19 exon2del transcript. In one approach, a TAQMAN® gene expression assay with two primers (Table 3; primer pairs A, B, C or D) and a fluorescent probe positioned to amplify the exon 2 splice junction of SEQ ID NO:3 were prepared. The sequence of the probe was AAACTCAGCCTGGCTGGACAG (SEQ ID NO:12). In a second approach, conventional, fluorescent-tagged, RT-PCR primers were prepared (Table 3; primer pairs A, B, or C), which amplify both wild-type CD19 and CD19 exon2del transcripts. Upon amplification, the relative abundance of each transcript may be quantitated using capillary sequencing.

TABLE 3

| Pair | Amplicon Size | Primer Name | Sequence | SEQ ID NO: | Primer Position |
|---|---|---|---|---|---|
| A | 498 bp | F1 | ctgaccaccatgccacctcctcgcc | 4 | exon1 |
|   |        | R1 | gcggtctttggcccacacatacagc | 5 | exon3 |
| B | 664 bp | F1 | ctgaccaccatgccacctcctcgcc | 6 | exon1 |
|   |        | R2 | ggtgcacatgggtccaggagagggg | 7 | exon4 |
| C | 742 bp | F3 | gccccggagagtctgaccaccatgc | 8 | exon1 |
|   |        | R3 | cccacatatctctggccgggcgatcg | 9 | exon4 |
| D | 1819 bp | F-f1 | agtctgaccaccatgccacctcctc | 10 | exon1 |
|   |        | R-f1 | acacacacttacacacatgcacaca | 11 | exon15 |

Further to the diagnostic methods described herein, the spliced mRNA may serve as a target for antisense oligonucleotide technologies or silencing RNA approaches (siRNA) targeting the splice junction and enabling in vivo extinction of this alternative splicing event thereby facilitating treatment with CD19 immunotherapies in patients expressing the CD19 exon2del isoform.

What is claimed is:

1. A kit comprising a thermostable polymerase and a pair of primer oligonucleotides for amplifying a nucleic acid of SEQ ID NO:3, and optionally a probe that hybridizes to the exon 2 splice junction of SEQ ID NO:3, wherein the pair of primer oligonucleotides comprise:
   (a) SEQ ID NO:4 and SEQ ID NO:5;
   (b) SEQ ID NO:6 and SEQ ID NO:7;
   (c) SEQ ID NO:8 and SEQ ID NO:9; or
   (d) SEQ ID NO:10 and SEQ ID NO:11, and
   the pair of primer oligonucleotides or probe comprises a reporter moiety.

2. The kit of claim 1, wherein the probe comprises SEQ ID NO:12.

3. A method for selecting a treatment for a subject with a B-cell malignancy, comprising:
   (a) measuring CD19 exon2del transcript expression levels in a sample of malignant B-cells from a subject using the kit of claim 1;
   (b) comparing the levels of CD19 exon2del transcript expression obtained in step (a) with a reference level of CD19 exon2del transcript or wild-type CD19 transcript expression; and
   (c) treating the subject with a CD19-independent treatment when the levels of CD19 exon2del transcript expression are elevated in the sample compared to the reference level.

4. The method of claim 3, wherein the reference level of CD19 exon2del transcript or wild-type CD19 transcript expression is obtained from a pool of subjects that have positively responded to treatment with a CD19 immunotherapeutic.

5. The method of claim 3, wherein the subject has acute lymphoblastic leukemia.

6. The method of claim 3, wherein the CD19-independent treatment comprises bone marrow transplantation or administration of an anti-CD22 immunotherapeutic, a BH3 mimetic or chemotherapeutic.

* * * * *